US006231994B1

(12) United States Patent
Totten

(10) Patent No.: US 6,231,994 B1
(45) Date of Patent: May 15, 2001

(54) TREATED ENCAPSULATED WOODEN WORKPIECE AND METHOD

(76) Inventor: Clyde Totten, 31317-F The Old Road, Castaic, CA (US) 91384

( * ) Notice: Subject to any disclaimer, the term of this patent is extended or adjusted under 35 U.S.C. 154(b) by 0 days.

(21) Appl. No.: 09/067,763

(22) Filed: Apr. 27, 1998

(51) Int. Cl.$^{7}$ .......... B32B 21/04

(52) U.S. Cl. .......... 428/537.1; 428/704; 428/907

(58) Field of Search .......... 428/537.1, 704, 428/907

(56) References Cited

U.S. PATENT DOCUMENTS 3,808,037 4/1974 Story .
3,870,672 3/1975 Mesa .
4,181,764 * 1/1980 Totten .......... 428/155
4,494,919 * 1/1985 Knudson et al. .......... 425/83.1
4,610,881 9/1986 Bechgaard .
4,620,990 * 11/1986 Dicker .......... 427/291
4,643,860 * 2/1987 Knudson et al. .......... 264/109
4,719,110 1/1988 Patel et al. .
4,879,083 * 11/1989 Knudson et al. .......... 264/122
4,904,517 * 2/1990 Lau et al. .......... 428/167
4,911,988 * 3/1990 Cass et al. .......... 428/537.1
4,983,618 1/1991 Pulido et al. .
5,061,698 * 10/1991 Malouf et al. .......... 514/64
5,087,457 2/1992 Bryant et al. .
5,104,664 * 4/1992 Palmere et al. .......... 424/660
5,151,127 9/1992 Thompson .
5,194,323 3/1993 Savoy .
5,224,315 7/1993 Winter, IV .
5,246,652 9/1993 Hsu et al. .
5,270,108 12/1993 Savoy .
5,273,787 * 12/1993 Gnatowski .......... 427/408
5,296,240 3/1994 Palmere et al. .
5,326,410 * 7/1994 Boyles .......... 156/71
5,356,624 10/1994 Croan et al. .
5,373,674 12/1994 Winter, IV .
5,432,000 7/1995 Young, Sr. et al. .
5,460,816 10/1995 Palmere et al. .

* cited by examiner

*Primary Examiner*—Bruce H. Hess
*Assistant Examiner*—B. Shewareged
(74) *Attorney, Agent, or Firm*—Bruce A. Jagger

(57) ABSTRACT

A moisture containing wooden core substantially fully encapsulated within a formed in situ substantially non-wetting water impervious thermoplastic envelope. An effective amount of an insect and fungi controlling water soluble reagent is provided within the envelope. Preferably, there is sufficient moisture in the envelope so that the reagent will migrate substantially throughout the wooden core. The encapsulated workpiece is preferably formed by dipping or spraying the moist wood core with the aqueous reagent, and encapsulating the resultant treated core before it dries out so that the core remains moist throughout its expected life span. Green freshly harvested wood can be treated, coated, and used in direct competition with dried wood, without risk of its warping, splitting and checking during its expected useful life. Boron containing compounds are preferably used as the infection controlling reagents.

4 Claims, 1 Drawing Sheet

14

22

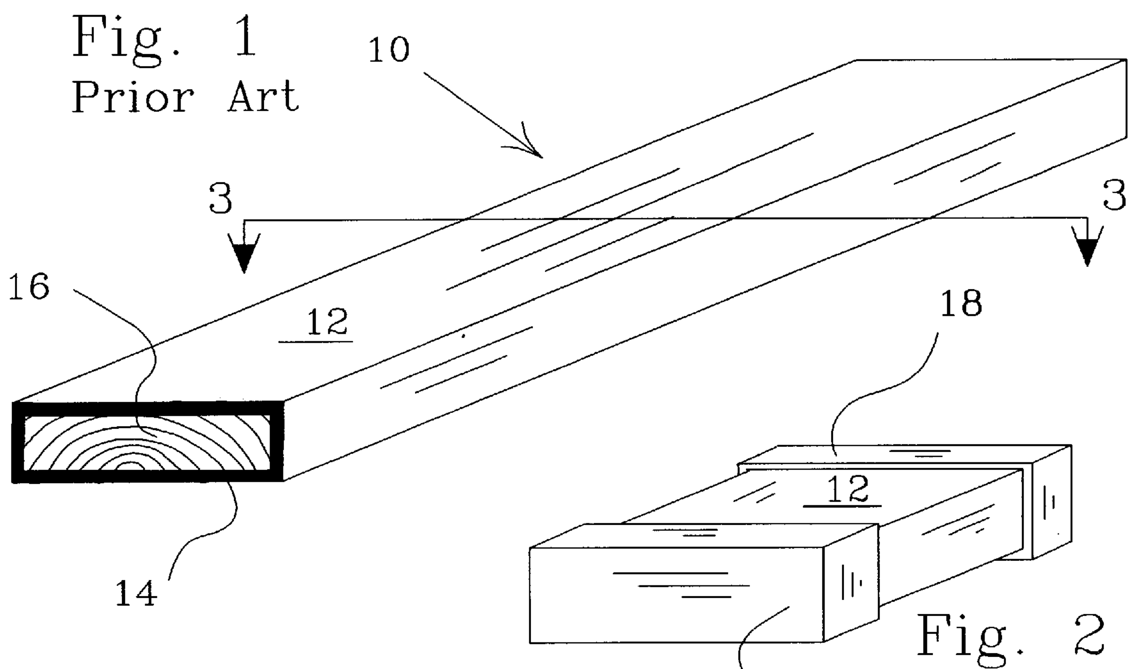
Fig. 1
Prior Art
10
3
3
16
12
18
12
14
Fig. 2
20
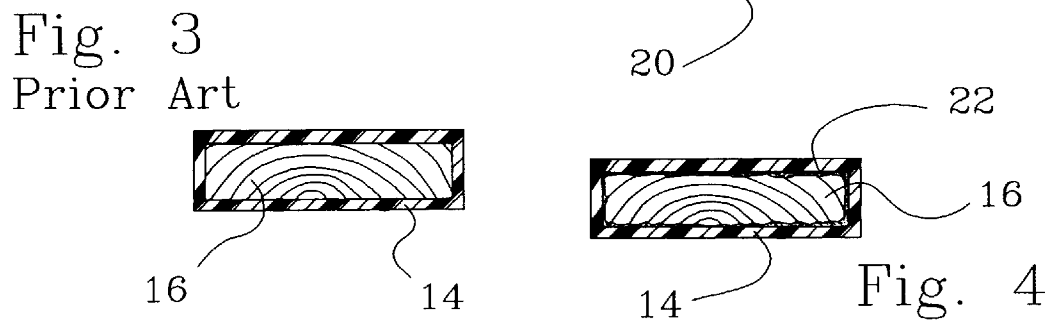
Fig. 3
Prior Art
22
16
16
14
14
Fig. 4
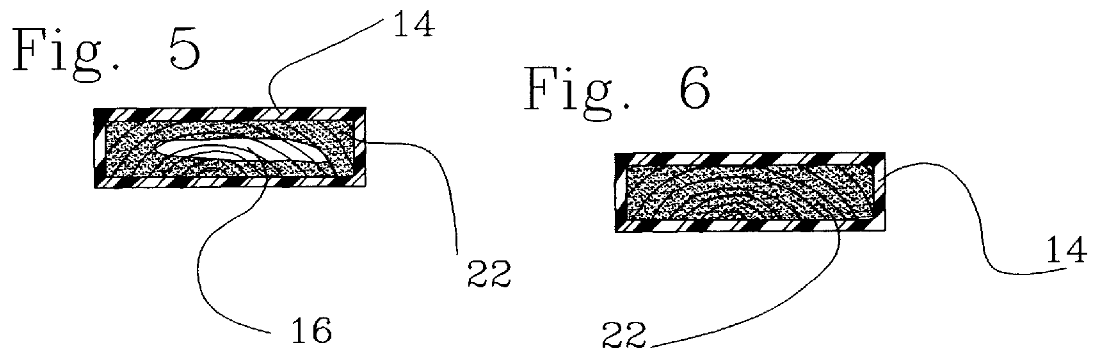
Fig. 5
14
Fig. 6
22
14
16
22

TREATED ENCAPSULATED WOODEN WORKPIECE AND METHOD

BACKGROUND OF THE INVENTION

1. Field of the Invention

The invention relates in general to protecting wood from wood destroying organisms, and, in particular, to substantially encapsulating a wooden workpiece in a waterproof thermoplastic sheath together with an effective amount of a water miscible infection controlling composition and, preferably, sufficient moisture to permit the composition to migrate throughout the workpiece.

2. Description of the Prior Art

It is well known that water soluble borates such as, for example, disodium octaborate tetrahydrate will control wood destroying organisms such as insects and fungi in wood and wood products. U.S. Borax, Inc., for example, sells a disodium octaborate tetrahydrate containing product under the "Tim-bor" mark which is intended to be used for this purpose. Such borates and other water soluble infection controlling compositions had generally been limited in their usefulness because, if treated wood were exposed to rain or substantial amounts of other ambient moisture, these water soluble compositions tended to leach out of the wood, leaving it exposed to infection. Treated wood, for example, could not be left exposed to the elements in use, storage or shipment. Thus, wood could not be treated at a central location, transported to and stored in the open at a construction site.

Attempts to seal treated wood to prevent leaching of water soluble compositions generally required careful preparation of the wood surface including thorough drying of the surface after treatment and before the application of sealing agents such as paint or stain. Such stain or paint sealing agents typically depended for their adhesion upon wetting the surface of the boron treated workpieces. Any localized failures in wetting based adhesion systems resulted in rapid overall failure of the system. Typically, the previous infection controlling reagents formed a crystalline deposit on the surfaces of the treated wooden object. Those deposits interfered with the adhesion of prior sealing agents to the surface. Typically, the treating processes did not maintain the wooden piece moist for a long enough period (typically weeks) to permit the reagent to penetrate all the way through the wood. This left most of the reagent on or near the surface with the inner parts of the wood untreated. The drying process which was previously required before the prior sealing agents could be applied produced checking and splitting which left pathways through the treated areas for the infection (termites and the like) to reach the untreated interior. Also, since the prior proposed sealants wet the surface when applied they tended to mix with and bind the reagent which was at the surface, thus rendering it largely ineffective. Since most of the active reagent was at or near the surface, this largely defeated the purpose of the treatment.

It is well known that the presence of moisture in treated woods promotes the migration of the water soluble treating agents into or throughout the wood. See, for example, Knudson et al. U.S. Pat. No. 4,879,083, and Dicker U.S. Pat. No. 4,620,990. The previous perceived need to dry the surface of treated wood prior to sealing it was counterproductive because it tended to remove the moisture which was needed to promote the migration of the treating agents into or throughout the wood, both initially and over the life of the product. Also green wood, that is, wood which had a moisture content of about 20 percent or more, tended to be difficult to seal as previously proposed unless first dried. When dried to the degree previously believed necessary prior to sealing it, the wood was subject to warpage, splitting, and the like. Also the drying process was generally costly.

The results from prior efforts to seal treated wood were generally partially or ineffectively treated wooden workpieces. Such partial or ineffectual treatment left the wood at least partially exposed to infection by wood destroying organisms. Partially sealed and reinforced wooden workpieces such as those proposed by Boyles U.S. Pat. No. 5,326,410 were generally at risk of becoming ineffective due to excessive leaching of the borate and of being weakened by reason of the borate containing bores formed in them.

Previous proposals to use glycols and glycol soluble borates with previously dried lumber were generally unsatisfactory, inter alia, because of economic and environmental factors. See, for example, Palmere et al. U.S. Pat. No. 5,104,664.

Wooden workpieces had previously been sealed in water impervious plastic sheaths to protect them from the elements. See, for example, Totten U.S. Pat. No. 4,181,764. In general the presence of significant amounts of moisture within the sealed sheath had been considered to be undesirable because of the risk of fungus attacking the encapsulated wood.

These and other difficulties of the prior art have been overcome according to the present invention.

BRIEF SUMMARY OF THE INVENTION

A preferred embodiment of the process of treating wooden workpieces according to the present invention comprises selecting a wooden workpiece which has a shaped surface, applying an admixture containing an effective amount of a water soluble infection controlling composition to the shaped surface, and substantially encapsulating the resultant treated surface by forming a generally molten mass of thermoplastic into a closely conforming non-wetting sheath over the treated surface. Sufficient moisture is preferably provided to enable an effective amount of the infection controlling composition to migrate substantially throughout the wooden workpiece within approximately 3 weeks.

The closely conforming sheath is conveniently formed, for example, by extruding molten thermoplastic around the wooden workpiece as the workpiece is passed through a die. In general the sheath has a thickness of at least approximately 0.005, and, preferably 0.015 inches or more. The sheath, although closely conformed to the surface of the workpiece, is not adhered to the surface of the workpiece through a wetted bond such as that formed between paint and a wooden surface. In general, the closeness of the sheath to the wood is such that there is less than about 0.001 inches of clearance between coating and the surface of the wood. Preferably, there is no clearance between the two. The nature of the thermoplastic is such that at the thickness used it is substantially impervious to liquid and vapor phase water. Polyethylene, for example, is an effective thermoplastic at thickness of, for example, at least about 0.005, and preferably 0.015 to 0.020 inches. In general, the thickness of the sheath is chosen to provide protection under the anticipated service conditions. Where there is a risk of some wear of the coating it is generally made thicker and/or of more durable plastic. Where the workpiece is expected to be used, for example, as a structural member in the wall of a building which will be closed up, the minimum thickness is generally adequate. Fence railings which are anticipated to be exposed to some wear generally require a thicker coating, up to, for example, 0.050 to 0.080 inches or more. The cost of the plastic generally limits the economically practical maximum acceptable thickness for most applications to less than approximately 0.2 inches.

Plastics which are particularly suitable for use as water impervious barriers according to the present invention are generally thermoplastic resinous polymers which are capable of being melt formed in situ to substantially encapsulate a wooden workpiece, and are substantially impervious to moisture, including, for example, thermoplastic homopolymers, copolymers, terpolymers and the like. Such thermoplastic resins include, for example, vinyl resins , poyvinyl chloride, polyethylene, polypropylene, polyolefins, acrylonitrilebutadiene, and the like. Such barriers are substantially impervious to both liquid and vapor phase water. Some very small amount of water migrates through these materials. However, over the expected life of the product (at least 10 years), the amount of moisture which migrates either way through the substantially water impervious encapsulating envelopes of the present invention has no significant impact on the effectiveness of the boron containing infection control agent.

Where the finished workpiece is intended for exterior use the barrier should be formulated so as to be protected from deterioration by ultraviolet, oxidants, and other environmental hazards. In general the barrier should be formulated to provide permanent, reliable protection for at least 10 or more years. If desired, a small amount of the infection controlling reagent can be mixed into the thermoplastic material to serve as an initial barrier against infestation.

For ease of application the barrier is preferably formed in situ from a molten mass of thermoplastic as one continuous encapsulating coating. If desired, however, the barrier can be formed in a plurality of steps from a plurality of different materials. For example, where only short term protection is required, or the wood is used in a dry environment, the ends of, for example, a long board can be painted with a heavy liquid sealant that will adhere at least temporarily to wet wood, and the balance of the wooden core is encapsulated in a formed in situ thermoplastic moisture barrier. Thus, the production and application of end caps or the like can be avoided where the end use of the workpiece permits. Such a partial encapsulation of the wooden core would generally not be satisfactory where the workpiece is destined for use in environments where flowing water or chronic wetness are likely to be encountered. In such environments, full encapsulation of the core in a fully enclosing and sealed envelope is desired. Less than fully encapsulated cores could be used in some exterior applications where generally dry conditions are likely to be encountered. In general, the encapsulation should be at least about 90 percent complete for all environments, and preferably, the unencapsulated areas of the core should be at the ends of the workpiece so as to minimize leaching of the infection control agent.

Where very thin films are used as the barrier, less than, for example, 0.015 inches thick, there may be some pin hole imperfections in the barrier. Even though the film is formed in situ so as to minimize the effects of any irregularities in the wooden core, some imperfections may occur. Applying an already formed film to the wooden core would likely result in more imperfections because the film would not conform so closely to the surface of the core. In situ formation permits the use of thinner films with more complete encapsulation, thus improving the product with the consumption of less plastic material. As will be understood by those skilled in the art, even when there are some imperfections in the coating, the core is still considered to be substantially fully encapsulated for the purposes of the present invention, because such tiny imperfections do not significantly impair the effectiveness of the infection control agent over the expected life of the product.

Preferably, the barrier sheath is formed in situ under conditions where it is substantially closely conformed, to the surface of the workpiece. When, for example, the barrier is formed from a mass of molten thermoplastic material around the workpiece in an extrusion die, the conditions are generally such that the barrier is not bonded to the surface, other than possibly by reason of mechanical interlocking with occasional imperfections on the surface of the workpiece. The roughness of the surface of the workpiece and the nature of that roughness, the temperature of the molten thermoplastic, the nature of the thermoplastic, and the like, all influence the mechanical interlocking, if any, of the coating with the surface of the workpiece. The plastic does not significantly wet the surface of the workpiece as does, for example, paint, varnish, or the like. The ability to use a substantially non-wetting plastic permits the utilization of thin films of very tough moisture impervious plastic materials on wet or dry surfaces of any configuration or character without concern for having to provide conditions which are conducive of wet based adhesion. High density polyethylene or polyvinyl chloride, for example, are tough moisture impervious materials which do not wet the wood to any significant degree, yet are very effective in the form of thin films of no more than about, for example, 0.005 to 0.020 inches thick. The union of the thermoplastic coating to the wood is primarily the result of the geometry of the periphery of workpiece about which the strong thermoplastic coating is formed in situ. The strength, hardness, durability, and other characteristics of the thermoplastic material can be tailored to meet the requirements of the desired end use. Delamination is not a problem because there is originally no significant lamination, and the geometry of the encapsulation of the external surface of the body establishes the union between the coating and the wood. A cross-section of the coated wood product shows that the periphery of the wood is fully enclosed by the close fitting coating. In a generally annular cross-section, for example, the hoop strength of the thermoplastic material primarily defines the strength of the union between the wood and the coating. The coating has the strength characteristics of the thermoplastic of which it is composed, and does not depend upon any bonding to the wood, for example, for its tensile strength. Paint, by contrast, is very weak and fails once it is separated from and unsupported by the surface. The non-wetting union between the coating and the wood surface also does not inhibit the infection controlling agent as does, for example, a wet bond based adhesion system.

Water soluble borates have been found to be particularly effective when utilized according to the present invention. Suitable water miscible boron containing treating agents include, for example, one or more of anhydrous borate, boric acid, hydrated borax, disodium octaborate tetrahydrate, zinc borate, sodium tetraborate decahydrate, sodium tetraborate pentahydrate, sodium metaborates, ammonium tetraborate, ammonium pentaborate, potassium tetraborate, sodium borate, water miscible boron admixtures such as those described, for example, in Malouf et al. U.S. Pat. No. 5,061,698, organic boron compounds such as those disclosed, for example, in Cass et al. U.S. Pat. No. 4,911,988, and the like. Other water soluble insecticide-fungicide suppressing compositions which are suitable, although less preferred, for use according to the present invention include, for example, chromated copper arsenic, ammoniacal cooper arsenic, pentachlorophenol, 2-thiocyanomethylthiobenzothiazole, 3-iodopropynylbutylcarbamate, and the like.

The infection controlling reagents are provided to the encapsulated wooden core in amounts which are effective to substantially prevent the growth of wood destroying organisms such as insects and fungi. Wood destroying insects include, for example, ants, beetles, termites, and the like. The minimum amount of reagent which is required to inhibit the growth of such organisms depends on the organism, the wood, and the reagent. In general, an amount of reagent is employed which is effective to substantially prevent the growth of all known wood attacking fungal, and insectal organisms, assuming that the reagent migrates throughout the workpiece. If it does not so migrate, there will generally be an amount of the reagent in the impregnated areas which is in excess of that required to suppress the anticipated infection.

The amount of moisture in the encapsulated wooden core should preferably, range from at least approximately 20 to 25 weight percent so as to provide for the migration of the reagent throughout at least a substantial part of the wood. Wood is generally considered to be dry enough so that dry rot will not occur at 19 percent or below moisture content.

The water soluble reagent is conveniently applied by a dipping or spraying operation. If desired, the wooden workpieces may be soaked in a vat of aqueous reagent for a few minutes before being encapsulated. The carrier for the reagent is preferably water so that at least a portion of the moisture which is required for migration within the workpiece comes from the carrier. In generally less preferred application procedures the reagent can be applied to the preferably pre-moistened surface of the workpiece as a powder, or an aqueous slurry of reagent may be rolled or troweled onto the surface.

The moisture content of uncured wood typically varies over a wide range from about 20 or 25 to over 60 or more percent moisture. Such green woods are entirely suitable, and are generally preferred, for treatment and encapsulation according to the present invention. When lumber is manufactured from freshly harvested living trees, the wood is said to be green until the moisture has been removed. As compared with, for example, kiln dried wood, the treated and encapsulated green wooden workpieces, according to the present invention, are of comparable price. Encapsulated green woods are generally not subject to warpage, splitting, checking, or other problems which are associated with the drying of wood. They are thus suitable for use in direct competition with dried uncoated lumber. The presence of an effective amount of infection preventing reagent within the closed envelope provided by the encapsulating coating renders it possible to use encapsulated green wood for many of the purposes where it was previously believed necessary to use kiln dried wood.

As used herein "insect" is intended to include beetles, termites and ants, and all other pests which infect and impair or destroy wood. The term "fungi" is intended to include all fungi which infect and impair or destroy wood. According to the present invention, infections of wooden workpieces by such wood destroying organisms are effectively controlled for the anticipated useful life of the wooden piece.

The degree of encapsulation required to protect the wooden workpiece from leaching is generally at least 90 percent coverage of the surface. Any less coverage risks leaching the reagent out of the wood. The reagent migrates with moisture through the wood, and attempts to reach and maintain a substantially uniform concentration throughout the moist portion of the workpiece. Thus, when the reagent is leached out of, for example, one end of the workpiece, the reagent in the rest of the workpiece migrates through moisture to the leached region in an attempt to equal out the concentration of reagent throughout the moist regions of the workpiece. The water which causes the leaching promotes the migration. If leaching continues, the concentration of reagent in the entire contiguous moist region of the workpiece will drop to the point where the reagent is not effective, and protection is lost.

The present invention is applicable to a wide range of natural and manufactured wooden workpieces including, for example, lumber, fiber board, chip board, plywood, and the like.

BRIEF DESCRIPTION OF THE DRAWINGS

Referring particularly to the drawings for the purposes of illustration and not limitation:

FIG. 1 is a perspective view of the prior art showing a coated wooden workpiece similar to Totten U.S. Pat. No. 4,181,764.

FIG. 2 is a perspective view of a preferred embodiment of the invention including a fully encapsulated treated wooden workpiece.

FIG. 3 is a cross-sectional view taken along line 3—3 of FIG. 1 of a coated but untreated wooden workpiece.

FIG. 4 is a cross-sectional view similar to FIG. 3 of a moisture containing wooden workpiece just after the sheath has been applied according to the present invention.

FIG. 5 is a cross-sectional view similar to FIG. 4 of a moisture containing wooden workpiece after the water soluble agent has migrated part way through the workpiece.

FIG. 6 is a cross-sectional view similar to FIG. 4 of a moisture containing wooden workpiece after the water soluble agent has migrated throughout the workpiece.

DETAILED DESCRIPTION OF THE PREFERRED EMBODIMENTS

Referring particularly to the drawings for the purposes of illustration only, and not limitation, there is illustrated generally at 10 a shaped wooden workpiece of the prior art in the form of a structural member 12 which includes untreated wood 16 encapsulated in a waterproof plastic sheath 14, but without end caps.

According to a preferred embodiment of the present invention, as shown, for example, in FIGS. 2, 4, 5, and 6, the surface of the structural member 12 is preferably first treated with an effective amount of a water soluble infection preventing composition. Plastic sheath 14 is applied over the treated surface to at least substantially encapsulate the wooden workpiece 16. Sufficient moisture is preferably encapsulated along with the water soluble infection preventing composition to permit it to migrate substantially throughout the wooden workpiece within approximately 4 weeks. End caps 18 and 20, or the like, are preferably provided to substantially fully encapsulate the wooden core. In lieu of separately formed end caps, the thermoplastic material can, for example, be pinched around the ends of the core and heat sealed. The water soluble infection preventing reagent can be applied in dry form, for example, a powder, to substantially the entire surface of a substantially dry workpiece 16 so that any moisture which is present or which enters by accident will not expose the workpiece to attack. In such dry cores, the reagent may never migrate throughout the workpiece, but it remains available should moisture enter the envelope, or an infectious agent appear.

According to one preferred embodiment, the untreated wood is dipped in, or sprayed with, an aqueous admixture of water soluble infection preventing composition, and the water impervious thermoplastic plastic sheath 14 is applied by extrusion while the surface is still at least damp. Such encapsulation by extrusion is described, for example, in Totten U.S. Pat. No. 4,181,764, which description is hereby incorporated herein by reference. Additionally, or in the alternative, a wooden core may be selected, such as a green piece of lumber, which has a high moisture content.

Referring particularly to FIG. 4, there is illustrated a green wooden workpiece (approximately 40 percent moisture) which has just been treated and encapsulated with waterproof sheath 14 according to the present invention. The water soluble infection preventing composition has just penetrated the surface of the green wood so that there is a layer of treated wood 22 adjacent to the surface. The main part of the core of the workpiece is still comprised of untreated green wood 16. After a week or so the water soluble infection preventing composition has migrated to a substantial depth so that only the heart of the core remains untreated. See, for example, FIG. 5. After a period of 3 or 4 weeks the composition has migrated or been carried by the moisture substantially throughout the core, as shown, for example, in FIG. 6, and only treated wood 22 is present.

The workpiece will remain in the condition shown in FIG. 6 for many years unless the encapsulating sheath is removed from the wood. Even if all or a significant part of the sheath 14 is removed after the wood is fully penetrated, and the moisture leaves the wood, the composition will stay in place and remain effective unless it is leached out. Preferably, the sheath is left in place even when the workpiece is not expected to be exposed to moisture. If unexpected exposure to moisture does occur, it will not diminish the protection enjoyed by the workpiece. Also, so long as the sheath remains in place and holds the as encapsulated moisture content in place, warping, cracking and splitting will be substantially prevented. Green, uncured lumber can generally be used interchangeably with dried wood provided the sheath 14 remains in place. The costs of drying, handling and storing dried wood are thus avoided.

The encapsulated workpiece is suitable for use in general construction where it may be exposed to rain or other moisture during or after the construction phase. Thus, such workpieces may be left exposed to the elements for years without losing their protection.

According to one preferred embodiment, the water soluble reagent is disodium octaborate tetrahydrate, the wood is green Douglas fir in the form of a 10 foot long 4×4 having a moisture content of approximately 40 percent, the coating is low density polyethylene, and the thickness of the coating is about 0.008 inches. The workpiece is immersed for from about 1 to 5 minutes in a trough containing a 15 to 38 weight percent aqueous solution of disodium octaborate tetrahydrate (the solution can be heated to increase the borate concentration, if desired). Upon being withdrawn from the solution the workpiece is immediately transported to a screw extruder where it is passed through a coating die where the polyethylene coating is applied. End caps are applied to the freshly extruded workpiece to fully encapsulate it. The encapsulation is preferably complete less than 30 minutes after the workpiece is withdrawn from the solution of reagent. Encapsulated products can be produced at rates exceeding, for example, 50 to 60 or more linear feet per minute with one extruder. The finished product, even with a moisture content of 40 percent or more, can be stored or used outside exposed to the elements for years, if desired, all without warping, splitting, checking or other deterioration.

What has been described are preferred embodiments in which modifications and changes may be made without departing from the spirit and scope of the accompanying claims.

What is claimed is:

1. A wooden workpiece comprising a wooden core having a shaped surface, a substantially non-wetting water impervious barrier encapsulating at least about 90 percent of said wooden core to form a closely conforming water impervious envelope, an effective amount of a water miscible infection controlling reagent within said water impervious envelope, and sufficient moisture to permit said reagent to migrate substantially throughout said workpiece, said closely conforming water impervious envelope comprising a formed in situ thermoplastic barrier having a thickness of at least about 0.005 inches.

2. A wooden workpiece of claim 1 wherein said substantially non-wetting water impervious barrier comprises a formed in situ thermoplastic coating.

3. A wooden workpiece of claim 1 wherein said wooden core contains at least about 20 weight percent water.

4. A wooden workpiece comprising a moist wooden core having a predetermined moisture content, a substantially non-wetting water impervious barrier substantially fully encapsulating said wooden core to form a water impervious envelope around and closely conforming to said core, an effective amount of a water soluble infection controlling reagent within said water impervious envelope, said predetermined moisture content being sufficient to enable an effective amount of said reagent to migrate substantially thoughout said wooden core, said substantially non-wetting water impervious barrier comprising a closely conforming formed in situ thermoplastic coating having a thickness of at least about 0.005 inches.

* * * * *